United States Patent [19]

Sato et al.

[11] Patent Number: 5,177,717
[45] Date of Patent: Jan. 5, 1993

[54] OPTICAL MEMORY MEDIUM AND ITS INFORMATION RECORDING AND ERASING METHOD AND APPARATUS

[75] Inventors: Yoshio Sato, Hitachi; Atsumi Watanabe, Yokohama; Satoshi Shimada; Hiroshi Sasaki, both of Hitachi; Nobuyoshi Tsuboi, Ibaraki; Hideki Nihei, Hitachi; Norifumi Miyamoto, Hitachi; Hiroaki Koyanagi, Hitachi; Hiroyuki Minemura, Hitachi, all of Japan

[73] Assignee: Hitachi, Ltd., Tokyo, Japan

[21] Appl. No.: 754,229

[22] Filed: Aug. 28, 1991

Related U.S. Application Data

[63] Continuation of Ser. No. 551,638, Jul. 12, 1990, abandoned, which is a continuation of Ser. No. 36,481, Apr. 9, 1987, abandoned.

[30] Foreign Application Priority Data

| Apr. 9, 1986 | [JP] | Japan | 61-79949 |
| Apr. 9, 1986 | [JP] | Japan | 61-79954 |
| Jun. 13, 1986 | [JP] | Japan | 61-135959 |
| Sep. 3, 1986 | [JP] | Japan | 61-205978 |

[51] Int. Cl.⁵ .............. G11B 13/04; G11B 11/10; G11B 11/12
[52] U.S. Cl. .............. 369/14; 369/13; 369/286; 369/288; 369/100
[58] Field of Search .......... 369/13, 14, 100, 288, 369/284, 286; 360/59, 114; 365/113, 122; 346/135.1, 76 L; 430/945, 495

[56] References Cited

U.S. PATENT DOCUMENTS

| 3,801,966 | 4/1974 | Terao | 365/113 |
| 4,434,429 | 2/1984 | Terao et al. | 346/135.1 |
| 4,499,178 | 2/1985 | Wada et al. | 430/495 |
| 4,637,008 | 1/1987 | Eden | 365/113 |
| 4,670,345 | 6/1987 | Morimoto et al. | 346/135.1 |
| 4,773,059 | 9/1988 | Minemura et al. | 369/100 |
| 4,773,060 | 9/1988 | Shimada et al. | 369/100 |

FOREIGN PATENT DOCUMENTS

| 0184189 | 6/1986 | European Pat. Off. |
| 60-15180 | 1/1985 | Japan |
| 60-166487 | 8/1985 | Japan |
| 60-180887 | 9/1985 | Japan |
| 60-186825 | 9/1985 | Japan |
| 60-262931 | 12/1985 | Japan |

OTHER PUBLICATIONS

Patent Abstract of Japan, vol. 10, No. 351 (P-520) (2407), Nov. 27, 1986. (JP/61-150141).

Primary Examiner—Hoa Nguyen
Attorney, Agent, or Firm—Antonelli, Terry, Stout & Kraus

[57] ABSTRACT

An information recording and erasing method and apparatus of an optical memory medium including a substrate, a guard film, and an intermediate layer portion so disposed between said substrate and said guard film as to include at least a recording material layer having a phase changing with temperature and include at least one good conductor layer, comprising the steps of supplying magnetic flux varying relatively to said good conductor layer to generate eddy currents within said good conductor layer, and heating said recording material layer with heat generated in said good conductor due to the eddy current loss to effect information recording and erasing with respect to said recording material layer.

40 Claims, 13 Drawing Sheets

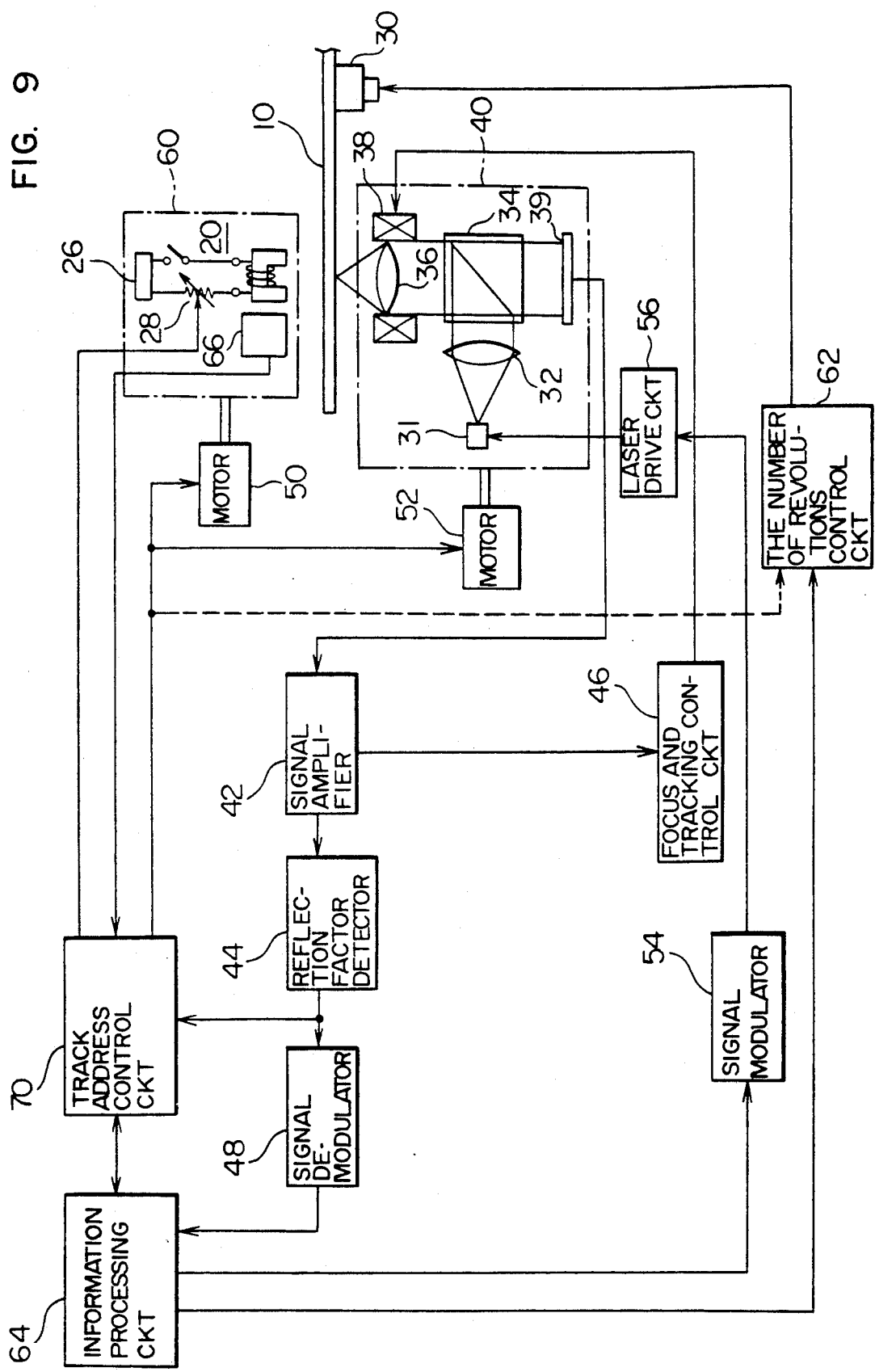

OPTICAL MEMORY MEDIUM AND ITS INFORMATION RECORDING AND ERASING METHOD AND APPARATUS

This application is a continuation of application Ser. No. 07/551,638, filed on Jul. 12, 1990, now abandoned, which is a continuation of application Ser. No. 07/036,481, filed on Apr. 9, 1987, now abandoned.

BACKGROUND OF THE INVENTION

The present invention relates to an optical memory medium for optically recording and reproducing information which is especially suitable to the information recording and erasing and also relates to an information recording and erasing method and apparatus of an optical memory medium which are suitable for surely recording and erasing information of the optical memory medium at high speed.

An apparatus for recording information at high density and reproducing it by using laser light condensed to a submicron order is capable of recording a large capacity of information such as video information or audio information and is expected to become an indispensable apparatus for the future information society. One of such recording and reproducing apparatuses is a known optical disk apparatus. In optical disk apparatuses, there are three types: (1) reproduction-only type; (2) postscript type; and (3) rewritable type. The reproduction-only type and the overwriting type have nearly reached the stage of practical use. On the other hand, no methods are established in the rewritable type yet. The rewritable optical disk using an optical magnetic material, phase change material or the like is now under vigorous research and development. In the opto-magnetic disks and optical disks using the phase change material now under research, information is erased by using laser light. In case of optical magnetic disks, however, the magnetic field must be inverted during the erasing operation. Accordingly, optical magnetic disks are not suitable to the so-called successive erasing and recording scheme in which the information recording is effected concurrently with the information erasing. In case of an optical disk using the phase change, the recording sensitivity is lower than the erasing sensitivity and hence a laser beam taking the shape of long ellipse is radiated for the purpose of erasing operation.

The optical disk using the phase change comprises at least a substrate, a recording material layer and a guard film layer. The recording material used for the optical disk is a material highly sensitive to electromagnetic waves such as laser light. That is to say, the recording material used for the optical disk is a recording material using the crystal-amorphous phase change represented by a recording material disclosed in U.S. Pat. No. 3341825 or an organic memory material using a pigment or polymer as disclosed in JP-A-60-166487, JP-A-60-15180 and JP-A-60-180887. The features of these material are as follows: (1) Although recording operation can be effected at high speed, erasing operation is slow; (2) The erasing temperature is higher or slightly lower than the heat-resisting temperature of the substrate (120° to 150° C. in case of a plastic substrate). If these recording materials are used for the erasing operation, therefore, a technique for heating the recording material for a long time without heating the substrate is required.

If a long ellipse laser beam provided apart from the laser beam for recording and reproducing operation is radiated to erase the information in accordance with the conventional method, the ratio of the major axis to the minor axis is limited to approximately 10:1. The material whose data can be erased by using an ellipse beam having the axis ratio close to 10:1 is poor in thermal stability and hence in long-term stability of data. In case of a material having a fine thermal stability, the data cannot be erased by an ellipse beam having an axis ratio of approximately 10:1. Further, high-speed erasing operation is difficult.

In addition, the erasing temperature is higher than or close to the heat-resistance temperature of the substrate. In spite of the fact that the data can be erased by heating the material for a long time, therefore, the data cannot be actually erased for preventing the substrate from being heated.

SUMMARY OF THE INVENTION

An object of the present invention is to provide such an optical memory medium that it is heated from the inside to prevent the substrate from being heated and the contents of the memory can be rewritten at high speed.

Another object of the present invention is to provide an information erasing method and its apparatus capable of rewriting data onto a memory at high speed without hampering the thermal stability.

In according with the conventional information recording and erasing method of a rewritable optical disk, the laser light is applied to the disk to supply the memory medium with thermal energy. This method is based upon the principle that the energy of the light enters the memory medium and vibrates molecules within the medium to heat it.

The present inventors perceived that a change in the magnetic flux supplied to a conductor causes an eddy current and heat is generated by this eddy current loss. By utilizing this fact, it is attempted to record and erase the information. That is to say, at least one layer of an optical memory medium is made as a good conductor layer, and a change in the magnetic flux is supplied from the outside to the good conductor layer to generate heat. A recording material layer is thus heated to record and erase the information.

That is to say, a change in the magnetic flux is supplied to the medium for attaining the erasing operation. As compared with the conventional erasing operation using laser light, a wider region of the optical memory medium can be heated. As a result, a wider region can be erased at a time and erasing can be effected at high speed.

In the recording operation, a change in magnetic flux is supplied to preheat the recording material and thereafter laser light is applied thereto to produce a phase change in the recording material, the data being recorded. As compared with the case where only the laser light is supplied to the recording material, therefore, the recording speed can be increased.

BRIEF DESCRIPTION OF THE DRAWINGS

FIG. 9 is a block diagram showing the first embodiment of the information recording and erasing apparatus of the optical memory medium according to the present invention.

FIGS. 18 to 21A and 21B show variants of the magnetic flux generator.

DESCRIPTION OF THE PREFERRED EMBODIMENT

At first, an optical memory medium suitable to the information recording and erasing method of the optical memory medium according to the present invention will now be described.

At least one layer of the optical memory medium such as an optical disk suitable to the present invention must be a conductor.

Figure 1:
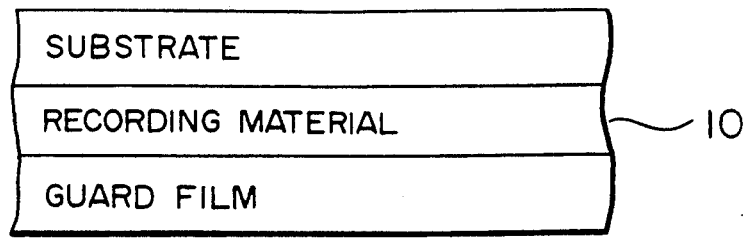
FIG. 1 shows an example of a conventional optical memory medium suitable to the information recording and erasing method of an optical memory medium according to the present invention.

The optical memory medium shown in FIG. 1 is composed of a substrate, a recording material layer, and a guard film layer. The recording material used here is a conductor. Such an optical memory medium is an optical recording alloy medium disclosed in JP-A-60-262931 and JP-A-60-186825 (U.S. Ser. No. 708931), for example. The substrate is preferably formed by glass, PMMA, polycarbonate, or epoxy resin, and is 1.0 to 1.2 mm in thickness. The recording material layer is formed by a phase change material of good conductor such as AgZn, AgAlCu or CuAlNi and is 30 to 100 nm in thickness. The guard film is made of an oxide such as $SiO_2$, $Ta_2O_5$ or $Al_2O_3$ and is 0.1 to 1.0 μm in thickness.

This optical recording alloy has two crystal structures at the room temperature. That is to say, the crystal structure obtained when the medium is heated to exceed the transformation temperature $\theta_1$ and then cooled rapidly differs from the crystal structure obtained when the alloy is maintained between the transformation temperature $\theta_2$ and $\theta_1$. Since the alloy thus has two distinct crystal structures at the room temperature, the physical or electric properties such as spectral reflectance of the electromagnetic wave like the laser light, electric resistivity, refractive index, polarization factor and transmission factor of one crystal structure differ from those of the other crystal structure. Accordingly, the information can be recorded by using the property change. That is to say, the information is recorded by raising the temperature of the medium above the transformation temperature $\theta_1$ and rapidly lowering it. And the information is erased by maintaining the medium between the transformation temperature $\theta_1$ and $\theta_2$ for a predetermined time.

When this optical recording alloy changes in phase between two distinct crystal structures, the alloy hardly changes in resistivity and the alloy exhibits the property of a good conductor for both crystal structures. When the good conductor property is thus exhibited at either of two crystal structure states, eddy currents are generated in the recording material and hence the simple film structure as shown in FIG. 1 suffices.

On the other hand, the optical memory medium disclosed in Japanese Patent Examined Publication No. 26897/71 (JP-B-47-26897) employs a recording material using the crystal-amorphous phase change as the recording material. The mechanism of the recording and erasing operation in the material using the crystal-amorphous phase change will now be described. That is to say, the medium becomes amorphous when its temperature is raised above the transformation temperature $\theta_1$ and then rapidly lowered. And the medium changes to crystal when the medium has been maintained between the transformation temperatures $\theta_2$ and $\theta_1$. The medium thus changes between crystal and amorphous phases in room temperature. Since the medium thus has two distinct crystal phases at the room temperature, the physical or electric properties such as spectral reflectance of the electromagnetic wave like the laser light, electric resistivity, refractive index, polarization factor and transmission factor of one crystal phase differ from those of the other crystal phase. Accordingly, the information can be recorded and erased by using the property change. When this material becomes amorphous, however, it turns to the insulation state and conducts little electricity. Even if a change in magnetic flux is supplied to this amorphous material, therefore, eddy currents are not generated.

Further, the recording material disclosed in JP-A-60-166487, JP-A-60-15180, JP-A-60-180887 and the like is an organic memory material using a pigment and polymer.

In case of the above described amorphous material or organic material, eddy currents are not generated even if the magnetic flux change is supplied to the material.

Figure 2A:
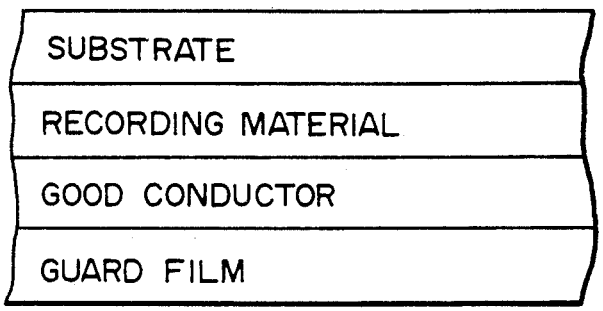
FIGS. 2A and 2B show an embodiment of an optical memory medium according to the present invention.
Figure 2B:
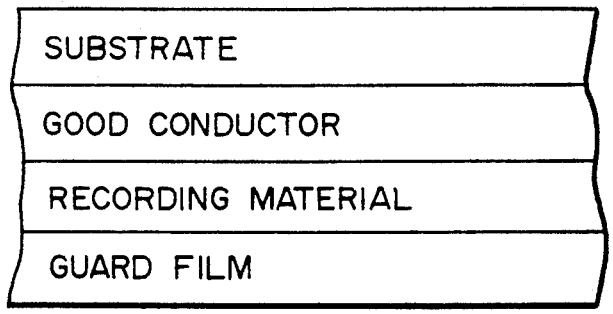
Figure 3:
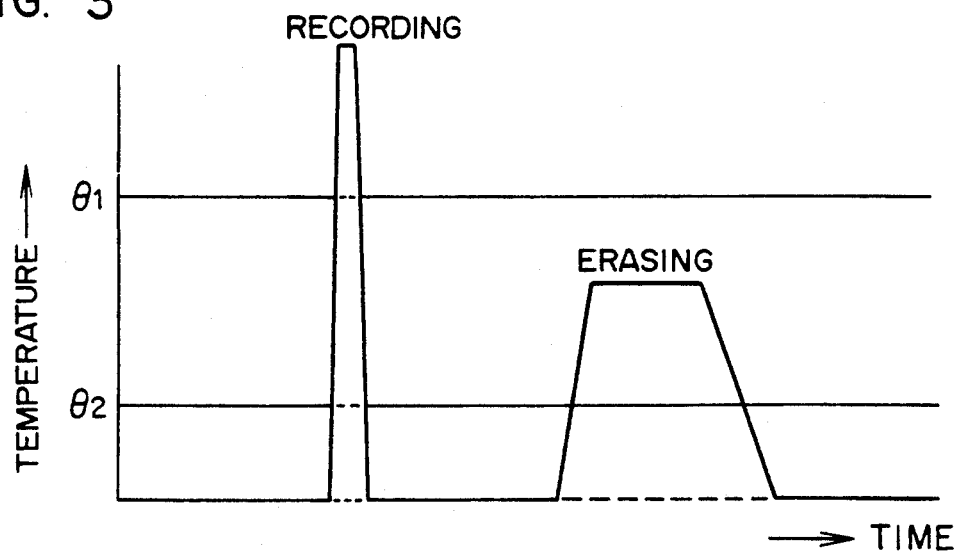
FIG. 3 is a time chart for illustrating the recording and erasing method of the optical memory medium shown in FIGS. 1 and 2.

In accordance with the present invention, a good conductor film is added adjacent to a recording medium as shown in FIGS. 2A and 2B provided that no or little eddy currents are generated in the recording medium. The present invention is characterized in that the recording material is indirectly heated by heat caused by the eddy current loss generated in the good conductor film and the recording and erasing operation is thus effected.

Here the above described recording material using the crystal-amorphous phase change is preferably a phase change material such as InSe or TeSnSe. In this case, the recording material layer has a film thickness of 0.05 to 0.5 μm. The good conductor is Al, for example, and is 1 to 100 μm in film thickness. The substrate and the guard film layer have the same material and film thickness as those of FIG. 1.

Figure 4:
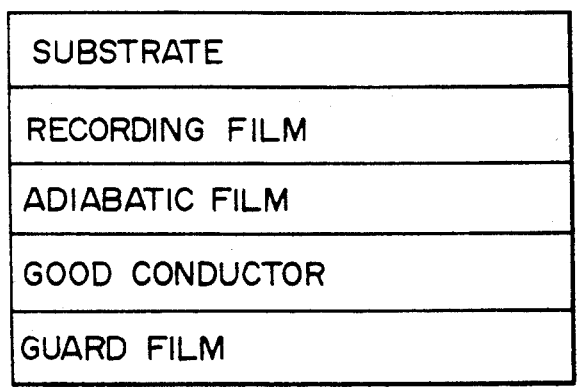
FIG. 4 shows another embodiment of an optical memory medium according to the present invention.

When a good conductor is added adjacent to a recording medium which is not a conductor as described above, there is a fear that the temperature rise of the medium during the recording operation is hindered and the recording sensitivity is lowered by a good conductor having high thermal conductivity. In the second embodiment of the optical memory medium according to the present invention, a layer of adiabatic material is disposed between the good conductor forming the heat generation source of induction heating and the recording material. The material and film thickness of the substrate, recording material layer, good conductor layer, and guard film layer shown in FIG. 4 are the same as those of FIGS. 2A and 2B. The material and film thickness of the adiabatic layer are the same as those of the guard film layer. If the magnetic flux change is supplied from the outside to the optical memory medium thus constituted, the recording material can be indirectly heated via the adiabatic material by the heat generated by the eddy current loss incurred in the good conductor. In order to eliminate the fear that the temperature rise of the recording material becomes dull during the recording operation and the recording sensitivity is degraded under the influence of the good conductor having high thermal conductivity, an adiabatic material is disposed between the good conductor and the recording material.

Figure 5A:
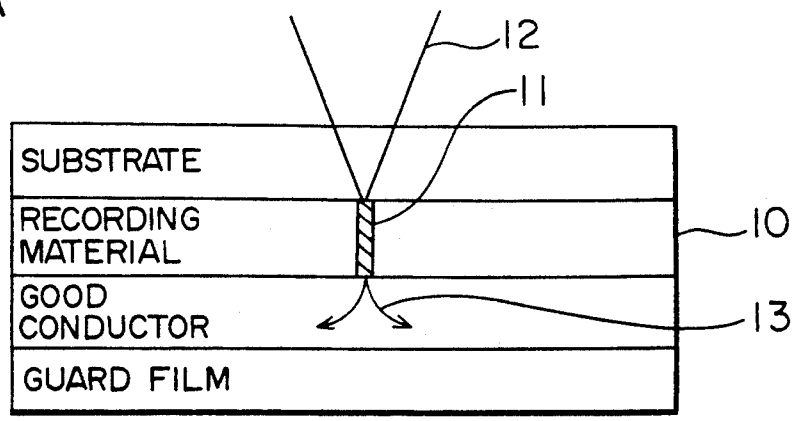
FIGS. 5A and 5B are schematic views for illustrating the heat conduction in the optical memory medium occurred when heat is radiated by laser light.
Figure 5B:
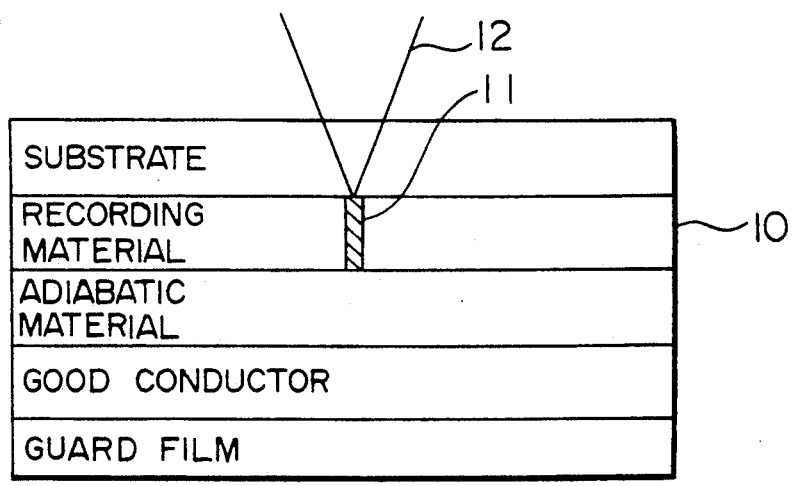

FIGS. 5A and 5B are schematic views for concretely illustrating the effects of the adiabatic material. In FIGS. 5A and 5B, a recording medium 10, a recording spot 11, laser light 12, and heat conduction 13 from the recording spot to the good conductor. FIG. 5A shows the case where the recording laser beam is applied to a recording medium having a film structure which does not include an adiabatic material. FIG. 5B shows the case where an adiabatic material is included. In the film structure which does not include an adiabatic material, the heat conduction from the recording spot to the good conductor is increased and the temperature rise of the recording spot becomes dull.

Figure 6:
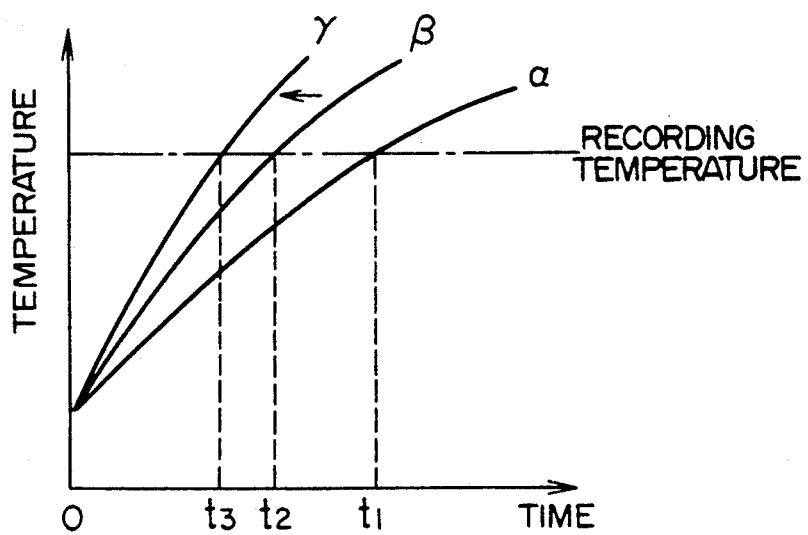
FIG. 6 shows the temperature change of the recording spot obtained during the recording operation.

FIG. 6 shows the temperature at the recording spot of the laser light during the recording operation as a function of time. Curves $\alpha$ and $\beta$ represent the temperature change of the recording medium having film structures shown in FIGS. 5A and 5B, respectively. A curve $\gamma$ represents the temperature change of the recording medium having the film structure of FIG. 1 which does not include the good conductor. Values $t_1$, $t_2$ and $t_3$ represent the recording time of the recording medium having film structures of FIGS. 5A, 5B and 1, respectively. In case the adiabatic material is absent, the temperature rise during the recording operation becomes dull because of higher thermal conductivity from the recording spot to the good conductor as compared with the case where the adiabatic material is present, as described with reference to FIGS. 5A and 5B. Assuming that the time taken for the temperature of the recording spot to reach the recording temperature is the recording time, the recording time can be represented as $t_1 \geq t_2 \geq t_3$. By changing the material quality and film thickness of the adiabatic material, however, the curve $\beta$ can be freely set between the curves $\alpha$ and $\gamma$. That is to say, the curve $\beta$ approaches the curve $\gamma$ if the film thickness of the adiabatic material is increased or an adiabatic material having low thermal conductivity is chosen. The curve $\beta$ approaches the curve $\alpha$ if the film thickness of the adiabatic material is decreased or an adiabatic material having high thermal conductivity is chosen. At this time, the recording time varies between $t_1$ and $t_3$. The recording sensitivity can be freely set within this range.

Figure 7A:
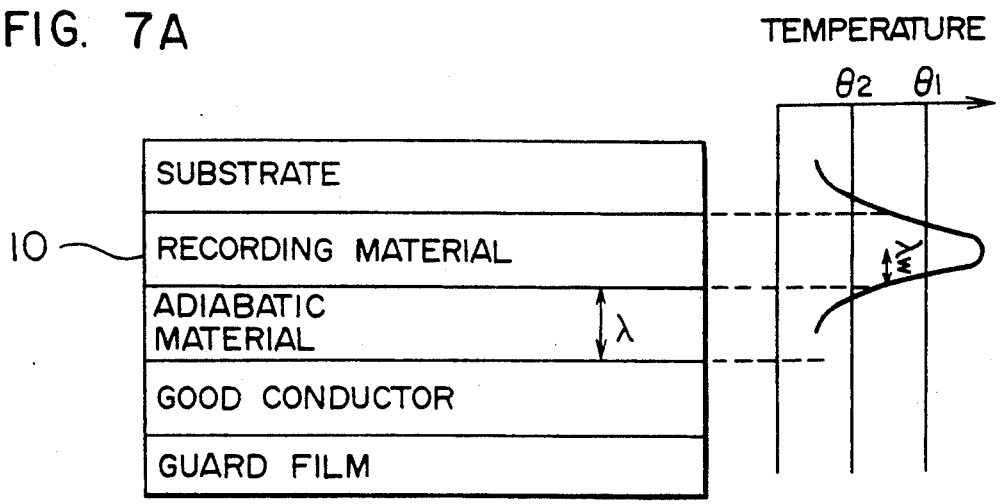
FIGS. 7A and 7B show the distribution of temperature appearing in the optical memory medium of FIG. 4 during the recording and erasing operation.
Figure 7B:
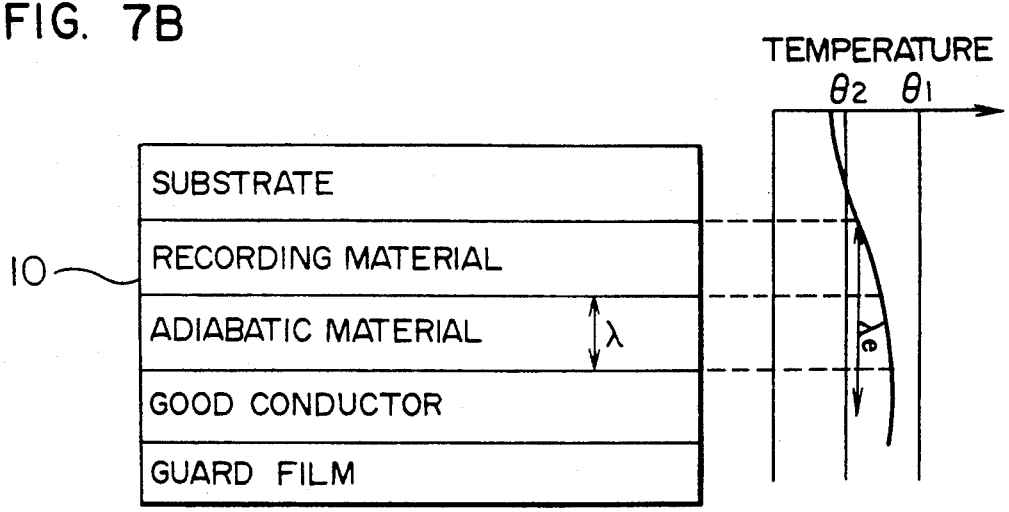

FIGS. 7A and 7B show the temperature distribution of the inside of the recording medium shown in FIG. 4 during the recording and erasing operation. In FIGS. 7A and 7B, numeral 10 denotes a recording medium. FIG. 7A shows the temperature distribution during the recording operation. FIG. 7B shows the temperature distribution during the erasing operation. The recording temperature and the erasing temperature are denoted by $\theta_1$ and $\theta_2$, respectively. The recording time and the erasing time of the recording material are represented by $t_w$ and $t_e$, respectively. The half-value widths of the temperature distribution in the film thickness direction during the recording and erasing operation are denoted by $\lambda_w$ and $\lambda_e$, respectively. Since the relation $t_w < t_e$ holds true in general, the relation $\lambda_w < \lambda_e$ is satisfied as shown in FIGS. 7A and 7B. Therefore, the film thickness $\lambda$ of the adiabatic material disposed between the recording material and the good conductor is so defined as to satisfy the relation $\lambda_w < \lambda < \lambda_e$. As a result, the heat conduction from the recording material to the good conductor is lowered during the recording operation. As described with reference to FIG. 6, therefore, the recording sensitivity is not lowered. Since the heat is sufficiently conducted from the good conductor heated by the eddy currents to the recording material during the erasing operation, the information can be erased. In case the recording material is indirectly heated, the temperature distribution within the recording material becomes more uniform as compared with the case where the recording material is directly heated by laser light or the like to erase the information. In case the recording material is indirectly heated, therefore, it becomes possible to prevent rewriting and incomplete erasing and erase the contents of the recording material completely. This effect is promoted by the adiabatic material disposed between the recording material and the good conductor.

The film structures of the recording medium heretofore illustrated show the minimum film structure for embodying the present invention. In case of use as the optical memory medium, a film for forming grooves, an optical absorption film, an adiabatic film for guarding the substrate and the groove forming film from the heat of the recording material film, and the like are often added to the above described films. The important factor of the present invention is that at least one layer of the films comprises a good conductor film and an adiabatic film is disposed between the recording material film and the good conductor film.

Figure 8:
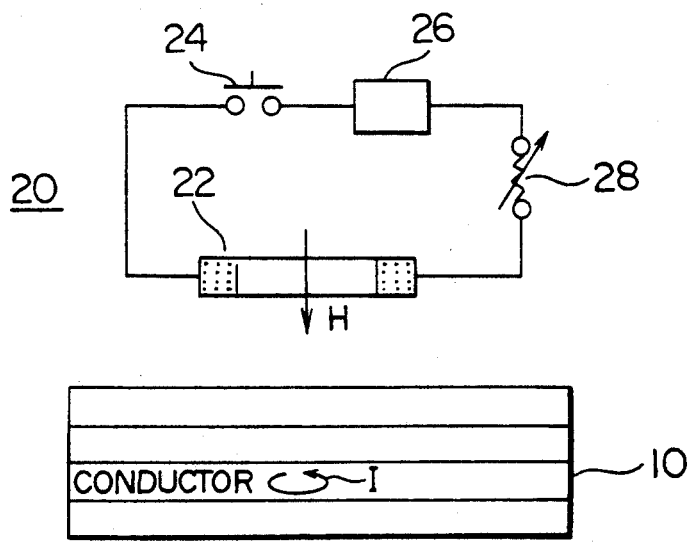
FIG. 8 shows the method for supplying the magnetic flux change to the optical memory medium.

A concrete method for generating the magnetic flux will now be described by referring to FIG. 8. A magnetic flux generator 20 of FIG. 8 is composed of a coil 22, a switch 24, a DC or AC source 26, and a variable resistor 28. When the switch 24 is closed, a current flows through the coil 22 to generate the magnetic flux H. If the position of the magnetic flux generator 20 is relatively varied with respect to that of the disk 10, eddy current I is generated on the conductor of the disk 10. Accordingly, the power source 26 may be either of the AC power source and the DC power source. The variable resistor 28 is used to control the strength of the magnetic flux H. And the resistance value of the variable resistor 28 can be adjusted according to the sensitivity of the recording medium. Instead of adjusting the resistance value of the variable resistor 28, it is possible to use a variable power source as the power source 26 and make its output value variable.

The information recording and erasing method and apparatus of the optical memory medium according to the present invention will now be described. FIG. 9 is a block diagram for illustrating the first embodiment of the information recording and erasing apparatus according to the present invention. In FIG. 9, an optical memory medium 10 such as an optical disk is rotated by a motor 30. The optical disk units heretofore developed are constant in either the number of revolutions or periphery speed. Here, an optical disk unit of constant number of revolutions type is used.

To one side of the optical disk 10, an optical head section 40 is disposed. To the other side of the optical disk 10, a magnetic flux generating section 60 including the above described magnetic flux generator 20 and an address sensor 66 is disposed. Alternatively, it is possible to unite the magnetic flux generating section 60 and the optical head section 40 together and dispose the united sections at one side of the optical disk.

In the optical head section 40, the light emitted from a semiconductor laser 31 is passed through a lens 32, a prism 34 and a lens 36 to be converged onto the reflective face of the disk 10 as a light spot.

The reflected light from the disk is passed through the lens 36 and the prism 34 again and reaches a photodetector 39 such as a sexpartite sensor to undergo the photoelectric conversion.

The output of the sensor 39 is amplified by a signal amplifier 42 and supplied to a focus and tracking control circuit 46 as an autofocus signal and a tracking error signal. On the basis of these input signals, the control circuit 46 supplies a control signal to a two-dimensional actuator coil 38 to control the position of the light spot in the focus direction and the track diameter direction. On the other hand, the output of the signal amplifier 42 representing the strength of the reflected light from the disk is supplied to a reflection factor detector 44. The output of signal amplifier is divided by a predetermined value in the detector 44. The resultant value indicates the reflection factor of the laser beam radiated onto the disk. The output of the detector 44 is supplied to a track address control circuit 70 and a signal demodulator 48. The output of the signal demodulator 48 is supplied to an information processing circuit 64 as the reproduced data of the information recorded on the disk. The information processing circuit 64 comprises CPU, ROM, RAM and I/O circuits therein.

During the reproduction, recording and erasing states, the information processing circuit 64 supplies a signal for directing a constant number of revolutions of the motor 30 to the number of revolutions (rotational speed) control circuit 62. The motor 30 is thus driven at a constant number of revolutions.

When the recording mode is set from the outside, the information processing circuit 64 supplies the recording information data to a laser drive circuit 56 via a signal modulator 54 to modulate the output of the laser 30 in accordance with the data. Further, the information processing circuit 64 supplies a control signal to a track address control circuit 70 to control motors 50 and 52 so that they will rotate at a constant speed. Accordingly, the optical head section and the magnetic flux generating section successively scan the tracks of the disk track by track and carries out the recording operation.

The motors 50 and 52 move the magnetic flux generating section 60 and the optical head section 40 in the diameter direction of the disk, respectively. The track positions of the magnetic flux generating section 60 and the optical head section 40 are detected by the address sensor 66 and supplied to the track address control circuit 70. The sensor 66 may be incorporated into the optical head section 40.

When the erasing mode is set, the information processing circuit 64 supplies the track address control circuit 70 with such a directive that the magnetic flux generating section and the optical head section will scan the tracks at an interval of predetermined number of tracks, say, 500 tracks. As a result, the control circuit 70 drives the motors 50 and 52 at the number of revolutions Ne which is equal to 500 times the number of revolutions Nr of the recording state.

On the basis of the output of the reflection factor detector 44, the track address control circuit 70 controls the magnetic flux density by controlling the number of revolutions of the motor 30 or the value of the variable resistor 28 or the output value of the power source 26 in the magnetic flux generating section 60. The information is thus appropriately erased at high speed.

The address sensor 66 may be an optical sensor for detecting the address recorded on the disk, or may be known means for detecting the relative position of the magnetic flux generating section with respect to the fixed portion of the apparatus.

When the disk 10 is rotated at a constant number of revolutions by the motor 30, the sensitivity at the inner periphery is different from that at the outer periphery because of difference in periphery speed. Accordingly, it is desirable to control the strength of the magnetic flux generated by the magnetic flux generator on the basis of the track address. Since the sensitivity is nearly in proportion to the periphery speed, it is desirable to control the strength of the generated magnetic flux on the basis of the periphery speed. To be concrete, the value of the variable resistor 28 shown in FIG. 9 or the output magnitude of the power source 26 is changed by the track address control circuit 70 on the basis of the track address. The current flowing through the coil 22 is thus changed. Accordingly, the strength H of generated magnetic flux can be changed. Thereby, the sensitivity can be kept constant between the inner periphery and the outer periphery.

In this way, the main feature of the present invention is that the magnetic flux generator 20 is added to the conventional optical disk unit.

That is to say, the magnetic flux generator 20 generates a magnetic field to cause eddy currents in the optical disk 10 as described with reference to FIG. 8. The disk is thus heated. When the recording medium within the disk has reached the erasing temperature $\theta_2$, the information or data recorded in the disk is erased.

Figure 10A:
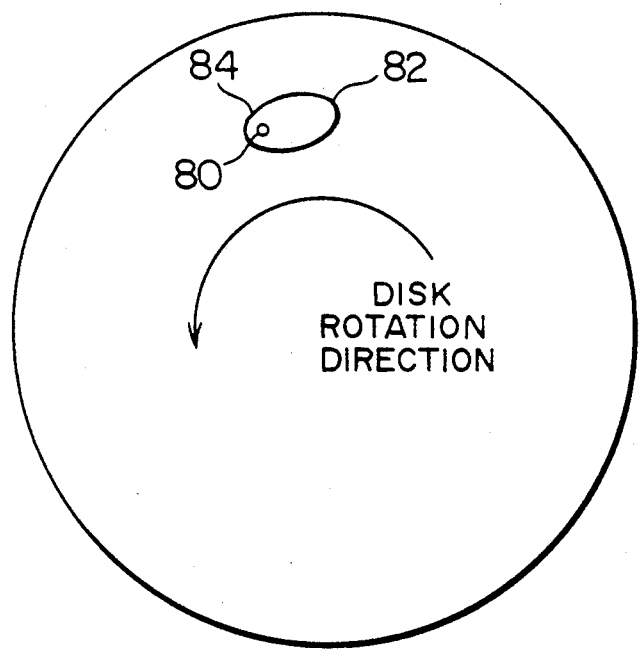
FIGS. 10A and 10B show an example of the information recording and erasing method of the optical memory medium according to the present invention.

Further, the magnetic flux generator 20 can also be used to raise the recording sensitivity. If laser light is radiated under the condition that the recording medium is so heated as to be below the erasing temperature by eddy currents, the burden of heating of the optical head 40 required for the recording operation is reduced, and the time required for the temperature to reach the recording temperature $\theta_1$ can also be shortened. In the illustrated example, the magnetic flux generator 20 is disposed on the side opposite to that of the optical head section 40. However, it is a matter of course that the magnetic flux generator 20 and the optical head section may be disposed on the same side. Further, it is possible to realize a recording system of overwriting scheme in which the information is recorded by the laser spot concurrently with the erasing operation, by disposing the position of the optical laser spot 80 on an end 84 of an eddy current occurrence portion 82 with respect to the rotation direction of the disk as shown in FIG. 10A.

Figure 10B:
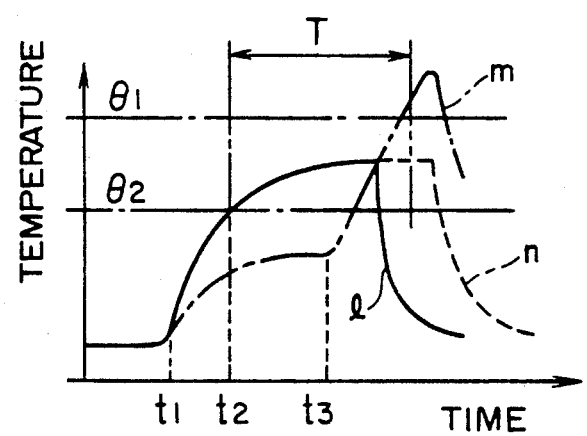

That is to say, the temperature of the recording material of the disk is raised by eddy currents during the erasing operation as shown in FIG. 10B. And eddy currents are generated so as to maintain the temperature of the recording material above the erasing temperature $\theta_2$ for predetermined time T (time necessary for erasing) as represented by a broken line n. As a result, the information can be erased. If the duration during which the temperature of the recording material is maintained above the erasing temperature $\theta_2$ is shorter than T as indicated by a line l, the information is not erased. The width of the eddy current occurrence portion in the radius direction during the erasing operation is equivalent to a plurality of tracks and preferably about 2,500 tracks (5 mm).

During the writing operation, eddy currents are so generated as to preheat the recording material to the temperature close to $\theta_3$. At time $t_3$, a strong laser spot is radiated onto the disk as shown in FIG. 10B. The temperature is raised to easily reach the recording temperature $\theta_1$ as represented by a broken line m. The recording operation is thus attained.

In this way, the laser light is radiated under the condition that eddy currents are so generated as to preheat the recording material during the writing operation. As a result, the information can be recorded on a portion whereto the laser spot is applied after a short radiation time of laser light. The recording sensitivity can thus be raised. In this case, the width of the laser spot in diameter direction is equivalent to approximately one track i.e., approximately 1 μm. The width of the eddy current occurrence portion in diameter direction is desired to be short and is equivalent to approximately 500 to 1,000 tracks, i.e., approximately 1 mm.

Figure 11:
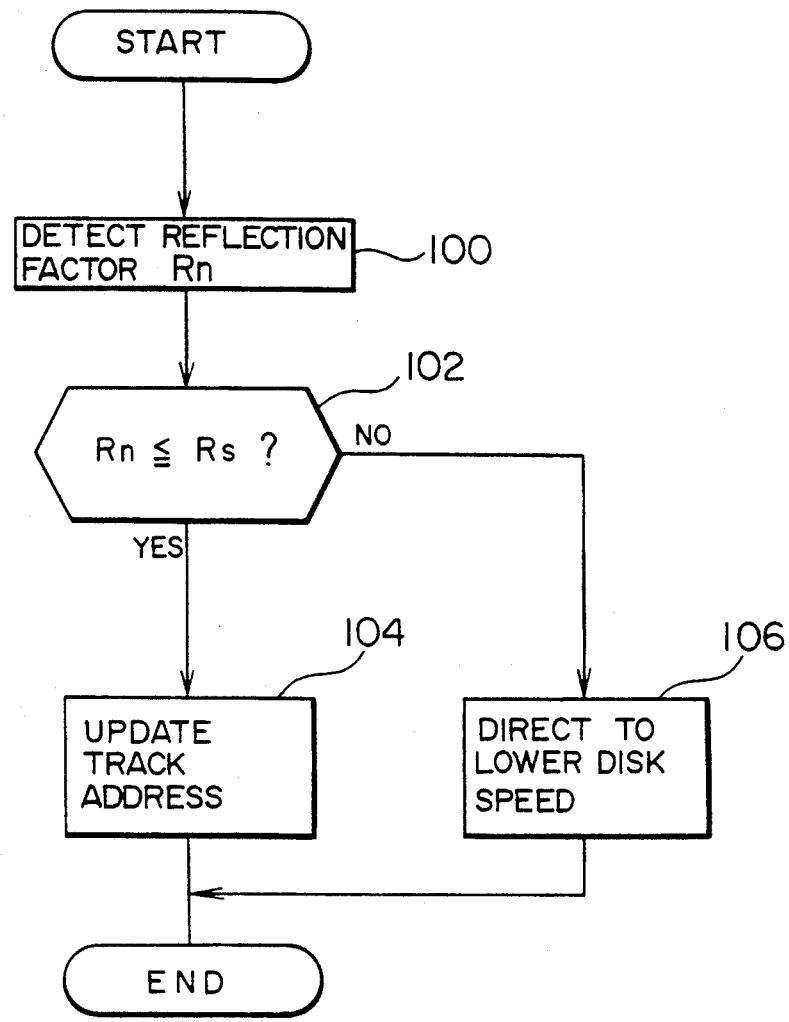
FIG. 11 is a flow chart showing the erasing operation in the first embodiment of FIG. 9.

The first embodiment of the information recording and erasing apparatus of the optical memory medium according to the present invention will now be described by referring to FIGS. 9 to 11.

During the recording mode, the strong laser spot 80 is radiated onto the eddy current occurrence portion 82 in accordance with the positional relation shown in FIG. 10A. On the basis of the data supplied from the information processing circuit 64 to the signal modulator 54 and the laser drive circuit 56, information is recorded.

In the erasing mode, one laser spot is radiated onto the eddy current occurrence portion of the disk. While monitoring the erasing state on the basis of the reflection factor, the information is erased. That is to say, the portion of the laser spot 80 is disposed on the end 84 of the eddy current occurrence portion 82 with respect to the rotation direction of the disk as shown in FIG. 10A. The reflected light is detected by the optical head section 40. And the reflection factor is derived by the reflection factor detector 44 and fed back to the track address control circuit 70.

The track address control circuit 70 adjusts the value of the variable resistor 28 or the output of the power source 26 so that the temperature of the end 84 of the eddy current occurrence portion 82 may be above $\theta_2$ and below $\theta_1$.

The information processing circuit 64 controls the laser drive circuit 56 via the signal modulator 54 so that the temperature of the end 84 of the recording material with the laser spot 80 having a weak constant strength applied thereto may become below 8 $\theta_1$.

The rotation speed of the motors 50 and 52 is set on the basis of the width of the eddy current occurrence portion 82 in diameter direction. If its width in diameter direction is equivalent to 500 tracks and hence 500 tracks can be erased at a time, the speed of the motors 50 and 52 must be 500 times that of the recording mode so that the optical head section 40 and the magnetic flux generating section 60 may scan the disk every 500 tracks.

The operation of the present embodiment in the erasing mode will now be described by referring to a flow chart of FIG. 11.

At step 100, the information processing circuit 64 reads the reflection factor Rn outputted from the reflection factor detector 44 via the track address control circuit 70. At step 102, the value Rn thus read is compared with a predetermined value Rs of the reflection factor stored in the ROM. If the value Rn does not exceed the predetermined value Rs, it is judged that the erasing operation has been completed and the track address is updated at step 104. That is to say, the address is updated to displace the optical head section 40 and the magnetic flux generation section 60 to the next track (500th track counted from the current track, for example). Accordingly, the motors 50 and 52 are driven at the predetermined number of revolutions Ne and the erasing operation is carried out at the next address region.

If the measurement $R_n$ of the reflection factor is larger than the predetermined value $R_S$, the processing is advanced to step 106 and the address is not updated. The information processing circuit 64 supplies a directive for slowing the rotation speed of the disk 10 to the number of revolutions control circuit 62. Accordingly, the magnetic flux generating section 60 and the optical head section 40 scan the same track region again at a slower speed. Thereby, the information erasing is completely attained.

The object of slowing the speed of the disk is to assure sufficient erasing time. Since a similar effect can be obtained by raising the temperature of the substrate, the directive for raising the strength of the magnetic flux issued from the magnetic flux generator 20 may be used at step 106 instead of the directive for lowering the speed of the disk.

In the above described embodiment, one reflection factor is monitored by using one light spot to effect the erasing operation.

Figure 12:
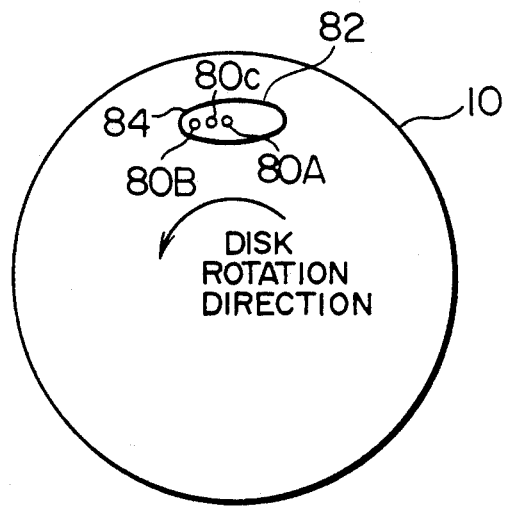
FIG. 12 shows the erasing method in a variant of the first embodiment of the information recording and erasing apparatus of the optical memory medium.
Figure 13:
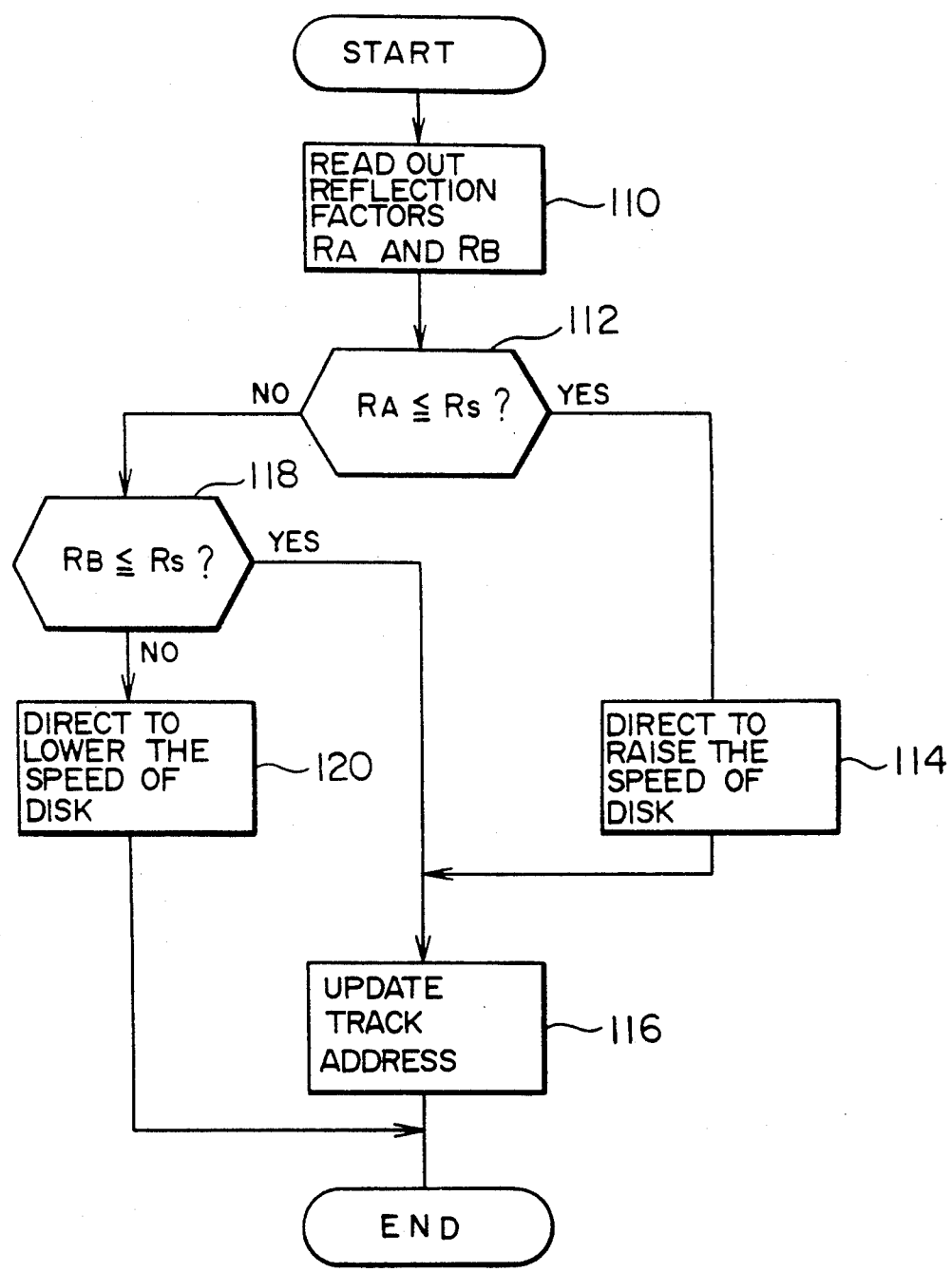
FIG. 13 is a flow chart for illustrating the erasing operation in the variant of the first embodiment.

A variant of the first embodiment will now be described by referring to FIGS. 12 to 14. In the variant of the first embodiment, a plurality of reflection factors are monitored by using a plurality of light spots to effect the erasing operation.

In the present variant, a plurality of, say, three light spots 80A, 80B and 80C are disposed on the end 84 of the eddy current occurrence portion 82 in the rotation direction of the disk. The three spots 80A, 80B and 80C are arranged along the circumference direction of the disk, and two of them are used for monitoring.

Figure 14:
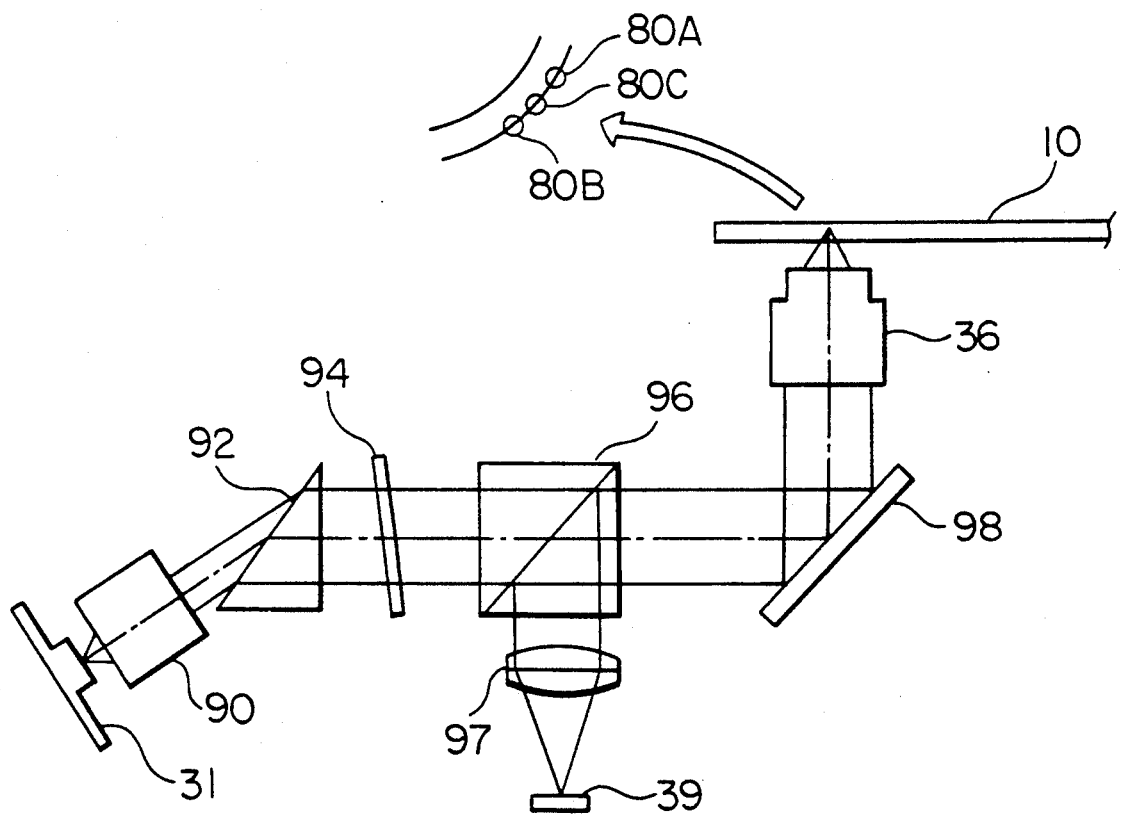
FIG. 14 shows the configuration of an optical head portion in the variant of the first embodiment.

The configuration of the optical head section 40 for forming these three beam spots is shown in FIG. 14. In the present embodiment, the configuration of FIG. 14 is used as the optical head section 40 of FIG. 9. In FIG. 14, the laser beam from a semiconductor laser 31 is passed through a collimate lens 90, a shaping prism 92, a diffraction grating 94, a beam splitter 96, a mirror 98, and an object lens 36. The laser beam is thus radiated onto the disk as three beam spots 80A, 80B and 80C. By disposing the diffraction grating 94 as illustrated, the laser beam can be divided into a plurality of beams (three beams in this example). By adjusting the inclination of the diffraction grating 94, the laser spots 80A, 80B and 80C can be arranged on the same track.

The reflected light beams from the spots 80A, 80B and 80C on the disk are passed through the object lens 36, the mirror 98, the beam splitter 96 and a cylindrical lens 97 to arrive at a detector 39. The reflect light beams are thus detected separately by a detector (tripartite sensor) 39.

In general, the central beam spot 80C has the strongest intensity of light (i.e., approximately, 70% of the whole intensity of light) among the three beam spots. Each of two spots 80A and 80B located at both ends has weak intensity of light (i.e., approximately 15% of the whole intensity of light each). In the erasing mode, therefore, the beam spots 80A and 80B are used. In this case, the intensity of light of the beam spot 80C is defined to be weak to such a degree that the recording is not effected at the position of the spot 80C.

The erasing operation in the present variant will now be described by referring to a flow chart of FIG. 13.

At step 110, measurements $R_A$ and $R_B$ of the reflection factors of the beam spots 80A and 80B are read. At step 112, it is checked whether the measurement $R_A$ of the reflection factor does not exceed a predetermined value $R_S$ stored in the ROM. The relation $R_A \leq R_S$ means that the erasing operation has already been completed at the position of the beam spot A. In order to further raise the scanning speed of the magnetic flux generating section 60, therefore, a directive is supplied at step 114 to the number of revolutions control circuit 62 to raise the rotation speed of the disk 10. At step 116, the track address is updated.

If tee relation $R_A > R_S$ holds true, it is checked at step 118 whether the measurement $R_B$ of the reflection factor does not exceed the predetermined value $R_S$. If the relation $R_B \leq R_S$ holds true, it is indicated that the erasing operation has been completed between the spots 80A and 80B. Accordingly, it is indicated that both the rotation speed and the strength of the magnetic flux have been appropriate. In this case, therefore, it suffices to update the track address at step 116. If the measurement $R_B$ of the reflection factor is larger than the predetermined value $R_S$, it is meant that the erasing operation has not been completed. Therefore, it is necessary to lower the rotation speed of the disk or raise the strength of the magnetic flux at step 120 and attempt the erasing operation again.

In the recording mode, the information is recorded by using the contral beam spot 80C. And the output of the laser 31 is so adjusted that beam spots 80A and 80B located at both ends will not take part in the recording operation.

In the present embodiment, one optical system is used for both the erasing mode and the recording mode by disposing a diffraction grating in the optical system of the optical head section 40. Alternatively, two optical systems of FIG. 9 may be disposed in the optical head section 40, and it may be configured that two beam spots are radiated by those optical systems in the erasing mode and their reflection factors are detected. In this case, the recording operation is carried out by one optical system in the recording mode.

Figure 15:
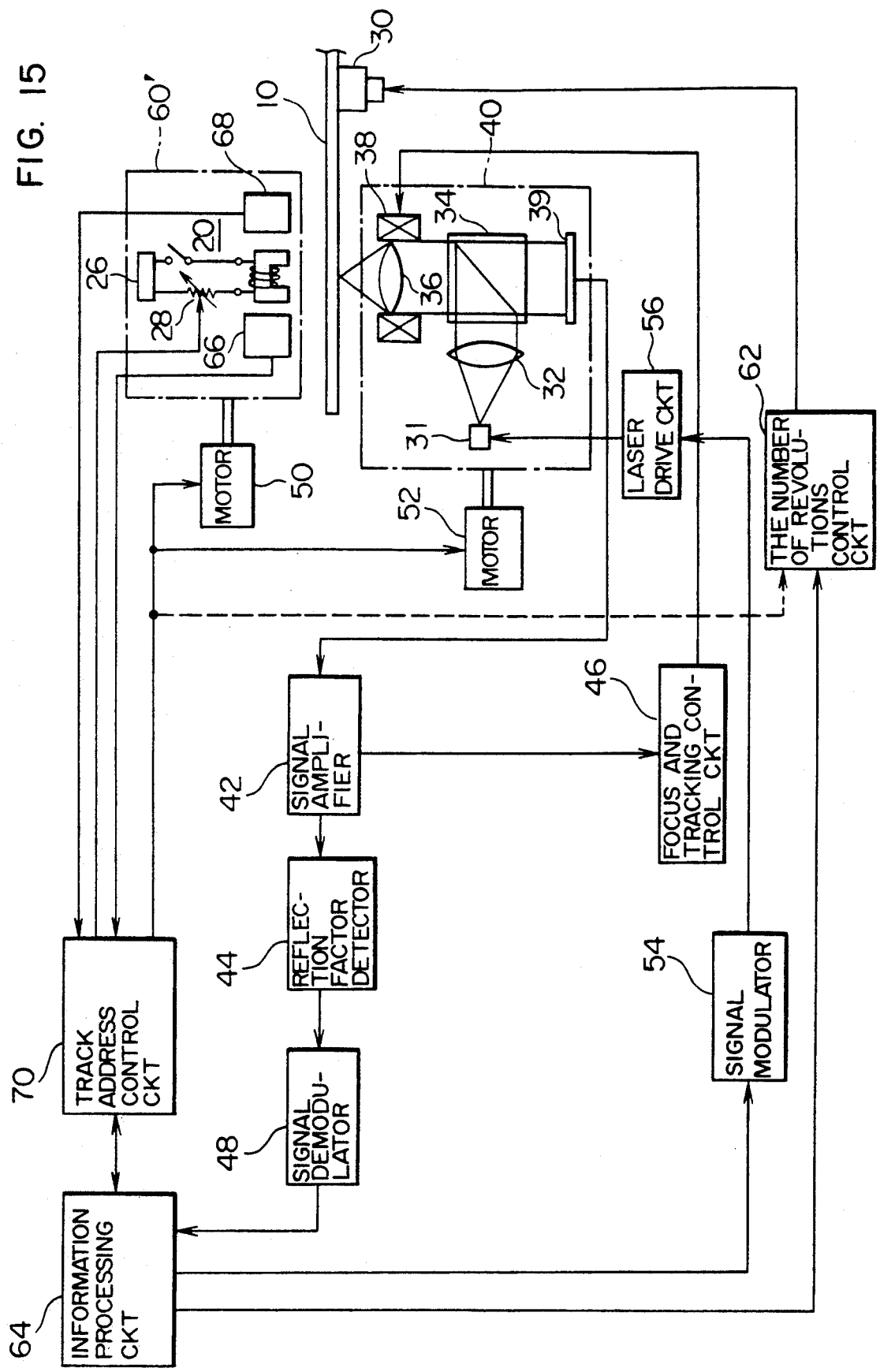
FIG. 15 is a block diagram for illustrating the second embodiment of the information recording and erasing apparatus of the optical memory medium according to the present invention.

In the first embodiment described above, the reflection factor of the beam spot is detected to monitor the erasing state. Alternatively, a temperature detector may be used to detect the temperature of the eddy current portion. The second embodiment of the present invention in which the erasing state is thus monitored by using the temperature detector will now be described by referring to FIGS. 15 to 17. FIG. 15 is a block diagram for illustrating the configuration of the second embodiment.

In the present embodiment, the operation of the recording mode is the same as that of the first embodiment.

In FIG. 15, components having the same functions as those of FIG. 9 are denoted by the same numerals.

In FIG. 15, the output of the reflection factor detector 44 is not supplied to the track address control circuit 70. Therefore, the reflection factor of the beam spot is not used for monitoring of the erasing state. In the erasing mode, therefore, the optical head section 40 is not driven and the laser 31 does not emit light.

Figure 16:
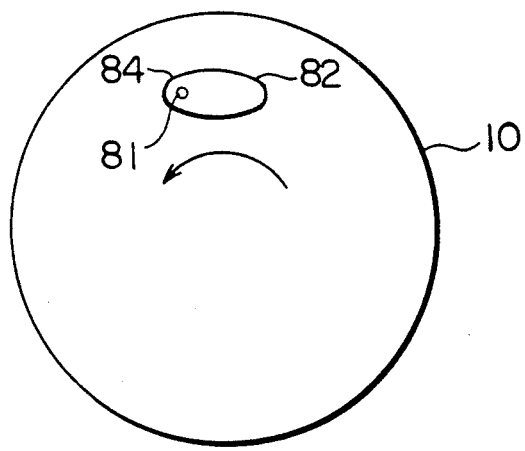
FIG. 16 shows the erasing method used in the second embodiment of FIG. 15.

In the present embodiment, a temperature sensor 68 such as an infrared sensor is integrally disposed within the magnetic flux generating section 60'. As shown in FIG. 16, the temperature sensor is so designed as to detect the temperature at one point 81 located on the end 84 of the eddy current occurrence portion 82 in the rotation direction of the disk. Because the end 84 of the eddy current occurrence portion is the highest in temperature, and the temperature must be so controlled as not to reach the recording temperature $\theta_1$. The output of the temperature sensor 68 is read by the information processing circuit 64 via the track address control circuit 70.

In the present embodiment, the detected temperature $T_R$ of the temperature sensor 68 is read into the information processing circuit 64 and compared with a predetermined temperature set point $T_S$ (a value slightly lower than the recording temperature $\theta_1$) stored in the ROM. The difference represented as $\Delta T = T_S - T_R$ is calculated and $\Delta T$ undergoes proportional integration to derive the set point of the magnetic flux strength of the magnetic flux generator 20. On the basis of the set point thus derived, the information processing circuit 64 controls the value of the variable resistor 28 of the magnetic flux generator 20 via the track address control circuit 70 to make the strength of the generated magnetic field the set point. Since the temperature is thus monitored and the strength of the magnetic flux or the rotation speed of the disk is controlled, the erasing operation can be surely effected at high speed.

Instead of deriving the set point of strength of the generated magnetic field, the set point of the rotation speed of the disk 10 may be derived from the proportional integration value of $\Delta T$ to control the motor 30.

In the first and second embodiments described above, the erasing operation is effected by monitoring the temperature of the eddy current occurrence portion or the reflection factor of the laser spot, i.e., by monitoring the erasing state. As a result, the erasing operation can be surely effected at high speed.

The methods for monitoring the erasing state of the eddy current occurrence portion is not limited to these methods.

It is a matter of course that the erasing operation can be carried out without monitoring the eddy current occurrence portion.

Further, the erasing operation may be carried out by using eddy currents and a strong laser spot.

In the technique heretofore described, the magnetic flux is applied to the disk to generate eddy currents and heat the disk. As compared with the conventional technique of converging the laser light and effecting spot heating, the technique allows a wide range of the disk to be heated. The technique is thus suitable to high-speed collective erasing operation. On the other hard, the effect of heating is not obtained when there is a large amount of leakage flux.

Figure 17A:
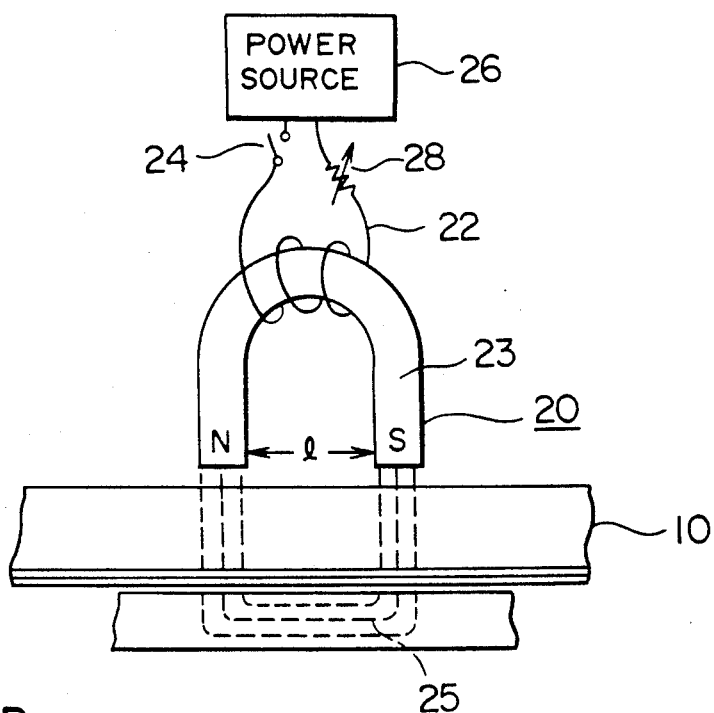
FIG. 17A shows the concrete configuration of a magnetic flux generator shown in FIG. 9.

The magnetic pole configuration of the magnetic flux generator 20 suitable to efficient eddy current generation will now be described. For this purpose, the magnetic poles N and S should be disposed on a plane parallel to the plane of the optical disk. FIG. 17A shows such an embodiment.

In FIG. 17A, the magnetic flux generator 20 is composed of a core 23, a coil 22, a switch 24, a power source 26 and a variable resistor 28. When the switch 24 is closed, a current flows through the coil 22 to generate magnetic flux $\phi$. Here the important factor is that at least one layer of the film of the disk 10 comprises a good conductor layer as described above.

When the relative position of the disk 10 with respect to the core 23 is varied, eddy currents are generated in the good conductor layer of the disk 10.

A core 25 is opposed to the core 23 via the disk 10. These components constitute a magnetic circuit for passing the magnetic flux generated from the core 23. The disk 10 basically comprises at least a substrate, a recording material layer and a guard film. The thickness of the substrate is generally 1.2 mm.

Figure 17B:
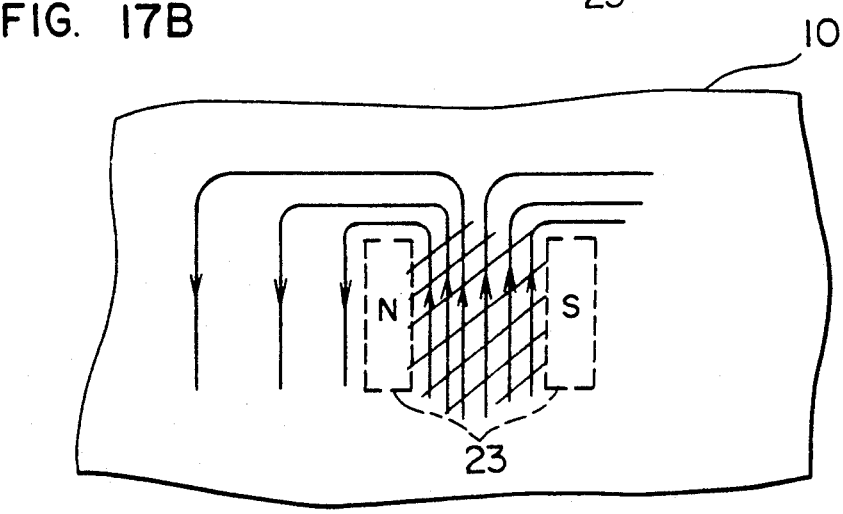
FIG. 17B shows eddy currents flowing in the disk as a result of magnetic flux generated by the magnetic flux generator of FIG. 17A.
Figure 18:
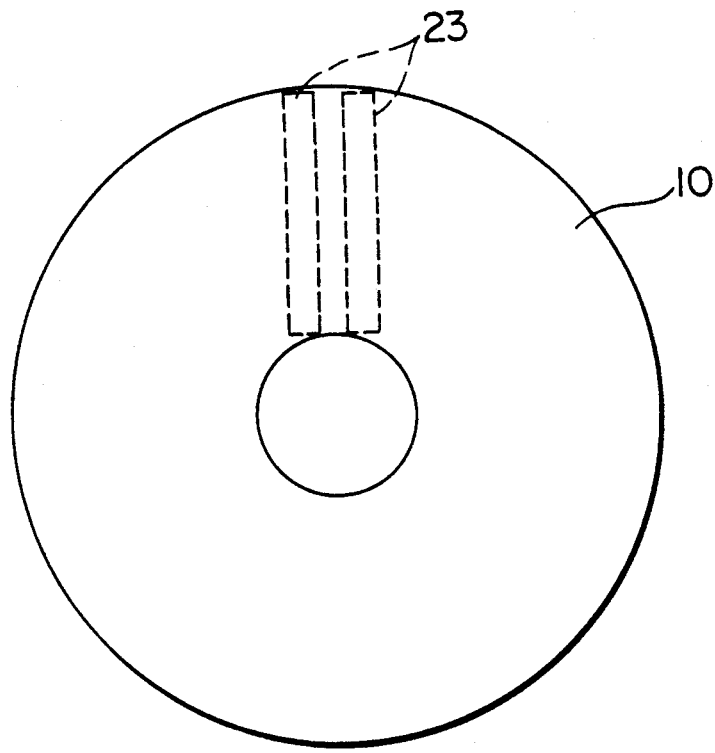

This substrate forms magnetic resistance similar to the air gap. If the poles N and S are brought closer in order to increase the magnetic flux density in the good conductor layer, the leakage flux between the poles N and S increases. Meanwhile, the magnetic flux density in the good conductor layer decreases, resulting in the lowered efficiency. That is to say, the distance 1 between the poles N and S is desired to be short so long as the leakage flux is not increased. If the distance 1 becomes shorter than the thickness of the substrate, however, the eddy current actually flowing int he conductor of the disk is reduced as compared with the given ampere turn. If the distance 1 is made larger, the air gap constituting a part of the magnetic circuit between the magnetic poles N and S is made larger, resulting in the reduced magnetic flux density in the recording film. If the core 25 is disposed, therefore, the magnetic resistance is lowered. A major part of the magnetic flux generated by the magnetic head passes through the core 25 and hence passes through the good conductor layer. If the magnetic flux $\phi$ generated from the core 23 is an alternating magnetic field, the eddy current is generated in such a direction as to hinder the change of the magnetic flux and Joule heat is generated. Even if the magnetic flux $\phi$ generated from the core 23 is a DC magnetic field, the magnetic flux of the good conductor layer changes when the disk is rotated, the eddy current being generated. Here, the case of the alternating magnetic field will now be described. FIG. 17B shows eddy currents flowing through the good conductor layer. The eddy currents flow around the poles N and S in the illustrated direction. The current density is low around the magnetic pole and becomes high between the magnetic poles. The generated energy density becomes high between the magnetic poles. Accordingly, the temperature of the good conductor layer between the magnetic poles can be raised.

Accordingly, the cores 23 and 25 are disposed so that the region between the magnetic poles N and S (shaded region of FIG. 17B) may become the eddy current occurrence portion 82 of each of the above described embodiments.

A variant of the magnetic flux generator thus constituted will now be described.

In each of the above described embodiments, the region between the core 23 of the magnetic flux generator 20, i.e., the eddy current occurrence portion has the length in the direction of disk diameter which is considerably shorter than the radius of the disk. If a pair of cores 23 are arranged in the diameter direction of the disk and the region between the magnetic poles is made nearly equal to the radius of the disk, all of the information within the disk can be erased in principle by only one revolution of the disk.

Figure 19:
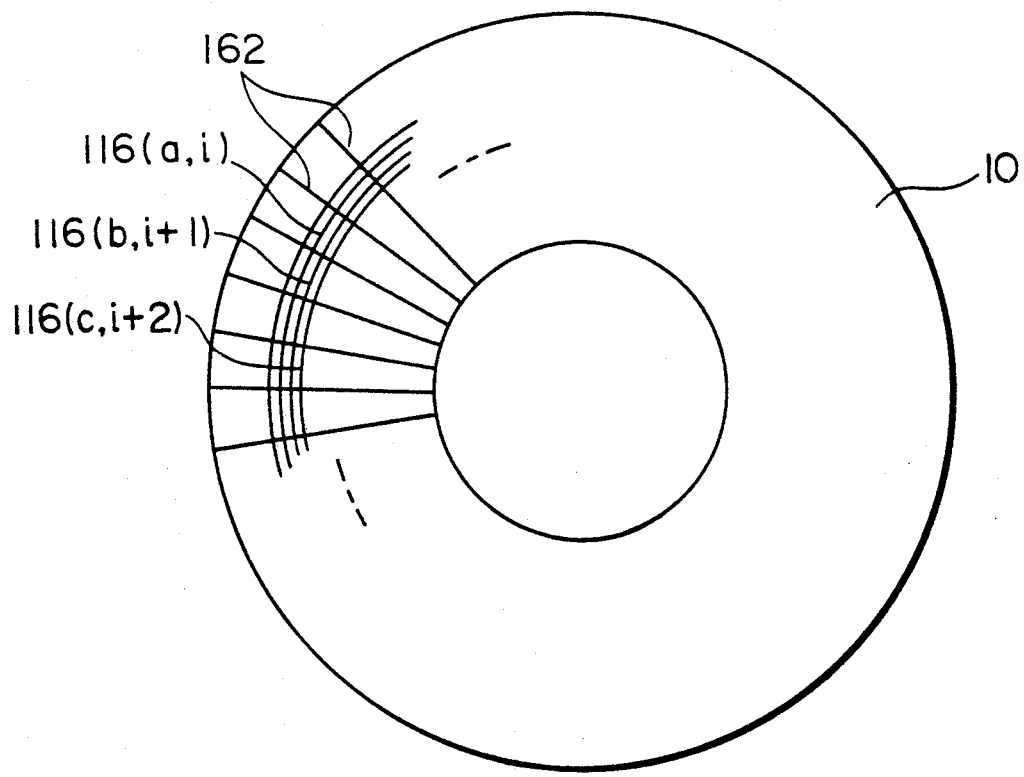
Figure 20:
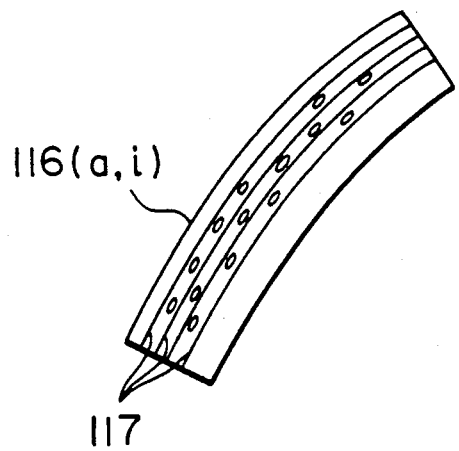

As shown in FIG. 19, the track of the actual optical disk 10 is composed of a number of blocks. That is to say, there are block addresses 162 in the circumference direction. Blocks are assigned as 116 (a, i), 116 (b, i+1), --- and insulators are disposed between respective adjacent blocks in the recording material layer. Further, each block is composed of a plurality of tracks 117. Therefore, it is also possible to divide a track within the disk into a plurality of blocks and apply the magnetic flux to a block taken as unit, i.e., to a plurality of tracks taken as unit in order to erase the information.

Figure 21A:
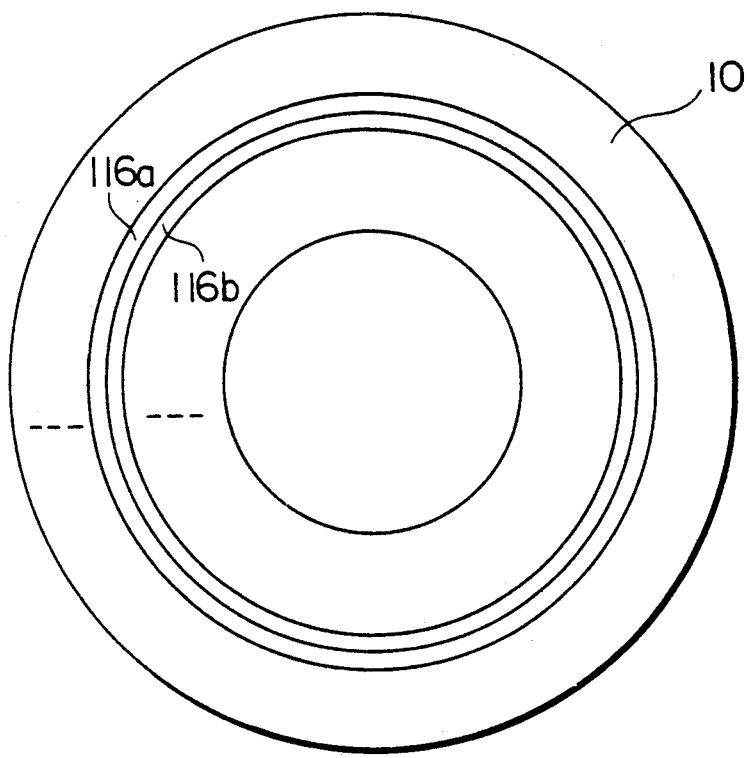
Figure 21B:
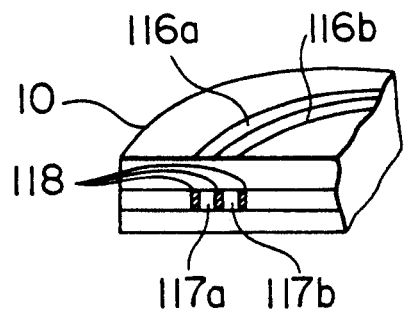

FIG. 21A shows the case where blocks 116a and 116b are concentrically formed. If insulators 118 are added between concentrical blocks 117a, 117b,--- of the good conductor layer in such a case as shown in FIG. 21B, there is no fear that the eddy current flows in the radius direction. Local heating thus becomes possible. In addition, the heat flow in the radius direction is reduced by insulators, the thermal efficiency being also raised.

In the optical memory medium according to the present invention, the recording material can be heated from the inside of the substrate. Therefore, the wide region of the recording material can be heated without excessively heating the substrate. Accordingly, the erasing speed can be raised. Further, it is possible to prevent the recording sensitivity from being lowered by inserting an adiabatic material between the recording material and the good conductor.

In the information recording and erasing apparatus of the optical memory medium according to the present invention, the recording material is heated by the eddy current. Therefore, high energy can be supplied to a large region. Furthermore, heat is generated from the inside of the optical memory medium. Accordingly, it is possible to preheat the recording material at high speed for erasing and recording operation without damaging the disk substrate. It is thus possible to provide an information recording apparatus having high reliability.

Further, the magnetic flux generator for generating the eddy current used for the present invention is capable of preheat a wide range of the disk. Accordingly, the recording and erasing operation can be effected at higher speed.

We claim:

1. An information recording and erasing method utilizing an optical memory medium comprising a substrate, a guard film, a recording material layer disposed between said substrate and said guard film, said recording material layer being heated by focused light to record information according to the focused light, and means responsive to a varying magnetic flux applied thereto for generating eddy currents for heating said recording material layer so as to enable at least one of recording of information on said recording material layer by the focused light and erasing of information from said recording material layer, said means for generating eddy currents being a good electrical conductor layer disposed between said substrate and said guard film, said method comprising the steps of:

supplying varying magnetic flux to said good conductor layer to generate eddy currents within said good conductor layer; and heating said recording material layer with heat generated in said good conductor layer due to eddy current loss to effect information recording with the focused light and erasing with respect to said recording material layer.

2. An information recording and erasing method according to claim 1, comprising the steps of:

erasing the information recorded on said recording material layer by supplying the varying magnetic flux to said good conductor layer to heat said recording material layer; and recording information in accordance with focused light by supplying the varying magnetic flux to said good conductor layer to heat said recording material layer and by applying focused light onto said recording material to heat said recording material.

3. An information recording and erasing method according to claim 2, wherein said recording material comprises a phase change material, and wherein said phase change material turns to the first state having the first crystal structure when said phase change material is heated above the first transformation temperature and then rapidly cooled, and said phase change material turns to the second state having the second crystal structure when said phase change material is maintained between the second transformation temperature lower than said first transformation temperature and the first transformation temperature for predetermined time or longer.

4. An information recording and erasing method according to claim 3, comprising the steps of:

erasing the recorded information by supplying a first varying magnetic filed to said good conductor layer and by maintaining said recording material layer between said first transformation temperature and said second transformation temperature for predetermined time to turn said recording material layer to the second state; and recording information in accordance with focused light by supplying a second varying magnetic field weaker than said first magnetic field to said good conductor layer to heat said recording material below said second transformation temperature and by temporarily applying said focused light onto a point of said recording material to heat said point so as to temporarily exceed said first transformation temperature and turn to said first state.

5. An information recording and erasing method according to claim 2, wherein said focused light comprises laser light.

6. An information recording and erasing apparatus utilizing an optical memory medium comprising a substrate, a guard film, a recording material layer disposed between said substrate and said guard film, said recording material layer being heated by focused light to record information according to the focused light, and means responsive to a varying magnetic flux applied thereto for generating eddy currents for heating said recording material layer so as to enable at least one of recording of information on said recording material layer by the focused light and erasing of information from said recording material layer, said means for generating eddy currents being a good electrical conductor layer disposed between said substrate and said guard film, said apparatus comprising:

magnetic flux generating means for supplying varying magnetic flux to said optical memory medium; and control means for controlling said magnetic flux generating means, said magnetic flux generating means supplying varying magnetic flux to said good conductor layer to generate eddy currents within said good conductor layer and heating said recording material layer with heat generated in said good conductor layer due to eddy current loss to effect information recording with the focused light and erasing with respect to said recording material layer.

7. An information recording and erasing apparatus according to claim 6, wherein in the erasing mode said magnetic flux generating means erases the information recorded on said recording material layer by supplying the varying magnetic flux to said good conductor layer to heat said recording material layer; and wherein in the recording mode said magnetic flux generating means supplies varying magnetic flux to said good conductor layer to heat said recording material layer, and said focused light generating means applies focused light onto said recording material to heat said recording material, thereby the information depending upon said focused light being recorded.

8. An information recording and erasing apparatus according to claim 7, wherein said recording material comprises a phase change material, and wherein said phase change material turns to the first state having the first crystal structure when said phase change material is heated above the first transformation temperature and then rapidly cooled, and said phase change material turns to the second state having the second crystal structure when said phase change material is maintained between the second transformation temperature lower than said transformation temperature and the first transformation temperature.

9. An information recording and erasing apparatus according to claim 8, wherein in the erasing mode said magnetic flux generating means supplies first varying magnetic field to said good conductor layer and maintains said recording material layer between said first transformation temperature and said second transformation temperature for predetermined time to turn said recording material layer to the second state, thereby the recorded information being erased, and wherein in the recording mode said magnetic flux generating means supplies a second varying magnetic field varying relatively weaker than said first magnetic field to said good conductor layer to heat said recording material below said second transformation temperature, and said focused light generating means temporarily applies focused light onto a point of said recording material to heat said point so as to temporarily exceed said first transformation temperature and turn to said first state, thereby information depending upon said focused light being recorded.

10. An information recording and erasing apparatus according to claim 9, wherein in the recording mode said focused light generating means applies the focused light onto an end portion of the eddy current occurrence region generated in said optical memory medium by said magnetic flux generating means.

11. An information recording and erasing apparatus according to claim 7, wherein said apparatus also includes detection means for detecting in the erasing mode the state of a portion of the optical memory medium where said eddy currents occur as one parameter indicating the state of information erasing, and wherein in the erasing mode said control means assures the erasing operation of information by controlling said magnetic flux generating means and said drive means in accordance with the output of said detection means.

12. An information recording and erasing apparatus according to claim 7, wherein when the output of said detection means indicates in the erasing mode that the erasing operation is sufficient said control means supplies address update directive to said moving means and at least supplies a directive to move said magnetic flux generating means to a next track address, and wherein when the output of said detection means indicates that the erasing operation is insufficient said control means does not supply the address update directive to said moving means and directs said drive means to lower the rotation speed or directs said magnetic flux generating means to increase the generated magnetic field.

13. An information recording and erasing apparatus according to claim 8, wherein said detection means detects the state of at least one point on an end portion, of an eddy current occurrence region generated in said optical memory medium by said magnetic flux generating means.

14. An information recording and erasing apparatus according to claim 12, wherein said detection means detects the states of two detection points disposed along the track direction on an end portion, of the eddy current occurrence region generated in said optical memory medium by said magnetic flux generating means, and one of said two detection points is located near the center of the eddy current region and the other of said two detection points is located near the end portion, wherein when the output of said first detection point indicates in the erasing mode that the erasing operation is sufficient, said control means directs said moving means to update the address and directs said drive means to rotate said optical memory medium at higher speed, wherein when the output of said first detection point indicates that the erasing operation is insufficient and the output of said second detection point indicates that the erasing operation is sufficient, said control means directs said moving means to update the address, and wherein when the outputs of said first and second detection points indicate that the erasing operation is insufficient, said control means does not direct said moving means to update the address, and directs said first drive means to lower the rotation speed or directs said magnetic flux generating means to increase the generated magnetic field.

15. An information recording and erasing apparatus according to claim 11, wherein said detection means detects the reflection factor of the reflected light of the focused light applied onto said optical memory medium by said focused light generating means and indicates that the erasing operation is sufficient provided that said reflection factor does not exceed a predetermined value and indicates that the erasing operation is insufficient provided that said reflection factor exceeds the predetermined value.

16. An information recording and erasing apparatus according to claim 12, wherein in the erasing mode said focused light generating means applies weak focused light to said optical memory medium so that the temperature at the radiation point of the focused light on the recording material will not exceed the temperature required to record information.

17. An information recording and erasing apparatus according to claim 12, wherein said moving means drives said magnetic flux generating means and said focused light generating means as one body.

18. An information recording and erasing apparatus according to claim 11, wherein said detection means comprises a temperature sensor for detecting the temperature of the eddy current occurrence region of said magnetic flux generating means.

19. An information recording and erasing apparatus according to claim 18, wherein said detection means is driven by said moving means together with said magnetic flux generating means as one body.

20. An information recording and erasing apparatus according to claim 18, wherein in the erasing mode said control means controls either said magnetic flux generating means or said drive means on the basis of a value obtained by applying proportional integration to the difference between the temperature measured by said detection means and a predetermined temperature set point.

21. An information recording and erasing apparatus according to claim 6, further comprising moving means for moving the focused light generated by said focused light generating means and the magnetic flux generated by said magnetic flux generating means in the diameter direction of said optical memory medium.

22. An information recording and erasing apparatus according to claim 6, wherein said magnetic flux generating means includes a pair of opposing magnetic poles arranged in parallel on one side of said optical memory medium, means for exciting coils wound around said magnetic poles, and a core opposing said pair of magnetic poles via said memory medium, and wherein said magnetic flux generating means generates eddy currents in a region of said good conductor layer of said memory medium corresponding to the region between said pair of magnetic poles.

23. An information recording and erasing apparatus according to claim 22, wherein said pair of magnetic poles all arranged along a track of said optical memory medium.

24. An information recording and erasing apparatus according to claim 22, wherein said pair of magnetic poles are arranged along the diameter direction of said optical memory medium.

25. An information recording and erasing apparatus according to claim 6, further comprising:
drive means for rotating said optical memory medium; and
focused light generating means for applying focused light onto said optical memory medium;
said control means further controlling said focused light generating means and said drive means.

26. An optical memory medium comprising:
a substrate;
a guard film;
a recording material layer disposed between said substrate and said guard film, said recording material layer being heated by focused light to record information according to the focused light; and
means responsive to a varying magnetic flux applied thereto for generating eddy currents for heating said recording material layer so as to enable at least one of recording of information on said recording material layer by the focused light and erasing of information from said recording material layer, said means for generating eddy currents being a good electrical conductor layer disposed between said substrate and said guard film.

27. An optical memory medium according to claim 26, wherein said recording material layer comprises a material having a phase which changes and varies between two crystal structures in accordance with temperature.

28. An optical memory medium according to claim 27, wherein said good conductor layer generates the eddy currents to heat said recording material to enable the phase change of said recording material.

29. An optical memory medium according to claim 28, wherein said good conductor layer comprises aluminum and is in the range of 1 to 100 $\mu$m in film thickness.

30. An optical memory medium according to claim 28, wherein said recording material comprises a phase change material, and wherein said phase change material turns to the first state having the first crystal structure when said phase change material is heated above the first transformation temperature and then rapidly cooled, and
said phase change material turns to the second state having the second crystal structure when said phase change material is maintained between the second transformation temperature lower than said first transformation temperature and the first transformation temperature.

31. An optical memory medium according to claim 26, further comprising an adiabatic material layer disposed between said recording material layer and said good conductor layer.

32. An optical memory medium according to claim 31, wherein said good conductor layer generates the eddy currents to heat said recording material layer via said adiabatic material layer.

33. An optical memory medium according to claim 31, wherein said adiabatic material layer comprises an oxide and is in the range of 0.1 to 1.0 $\mu$m in film thickness.

34. An optical memory medium according to claim 31, wherein said adiabatic material has a thickness $\lambda$ within a range of $\lambda\omega<\lambda<\lambda e$, wherein $\lambda w$ and $\lambda$ are half-value widths of a temperature distribution in the thickness direction of the optical memory medium during the recording and erasing operation, respectively.

35. An optical memory medium according to claim 26, wherein said recording material layer constitutes said good conductor layer.

36. An information recording and erasing method utilizing an optical memory medium comprising a substrate, a guard film, a recording material layer disposed between said substrate and said guard film, said recording material layer being heated by focused light to record information according to the focused light, and means responsive to a varying magnetic flux applied thereto for generating eddy currents for heating said recording material layer so as to enable at least one of recording of information on said recording material layer by the focused light and erasing information from said recording material layer, said means for generating eddy currents being a good electrical conductor layer disposed between said substrate and said guard film, said method comprising the steps of:
supplying varying magnetic flux to said good conductor layer to generate eddy currents within said good conductor layer, and heating said recording material layer with heat generated in said good conductor layer due to eddy current loss and maintaining said recording material layer temperature below a recording transformation temperature; and
recording information in accordance with the focused light.

37. An information recording and erasing method according to claim 36, further comprising the step of erasing the information recorded on said recording material layer by supplying the varying magnetic flux to said good conductor layer to heat said recording material layer.

38. An information recording and erasing apparatus utilizing an optical memory medium comprising a substrate, a guard film, a recording material layer disposed between said substrate and said guard film, said recording material layer being heated by focused light to record information according to the focused light, and means responsive to a varying magnetic flux applied thereto for generating eddy currents for heating said recording material layer so as to enable at least one of recording information on said recording material layer by the focused light and erasing of information from said recording material layer, said means for generating eddy currents being a good electrical conductor layer disposed between said substrate and said guard film, said apparatus comprising:
means for supplying varying magnetic flux to said good conductor layer to generate eddy currents within said good conductor layer and for heating said recording material layer with heat generated in said good conductor layer due to eddy current loss and for maintaining said recording material layer below a recording transformation temperature; and
focused light generating means for applying focused light onto said optical memory medium.

39. An information recording and erasing apparatus according to claim 38, wherein in the erasing mode said means for supplying varying magnetic flux erases the information recorded on said recording material layer by supplying the varying magnetic flux to said good conductor layer to heat said recording material layer; and wherein in the recording mode said means for supplying varying magnetic flux supplies the varying magnetic flux to said good conductor layer to heat said recording material layer below the transformation temperature, and said focused light generating means applies focused light onto said recording material layer to heat said recording material layer, whereby information is recorded in dependence upon said focused light.

40. An information recording and erasing apparatus according to claim 39, wherein in the recording mode said focused light generating means applies the focused light onto an end portion of an eddy current occurrence region generated in said optical memory medium by said means for supplying varying magnetic flux.

* * * * *